Sept. 6, 1932.  B. W. FREEMAN  1,875,720
WORK SUPPORTING DEVICE FOR SHOE ORNAMENTING MACHINERY
Filed July 19, 1927  2 Sheets-Sheet 1
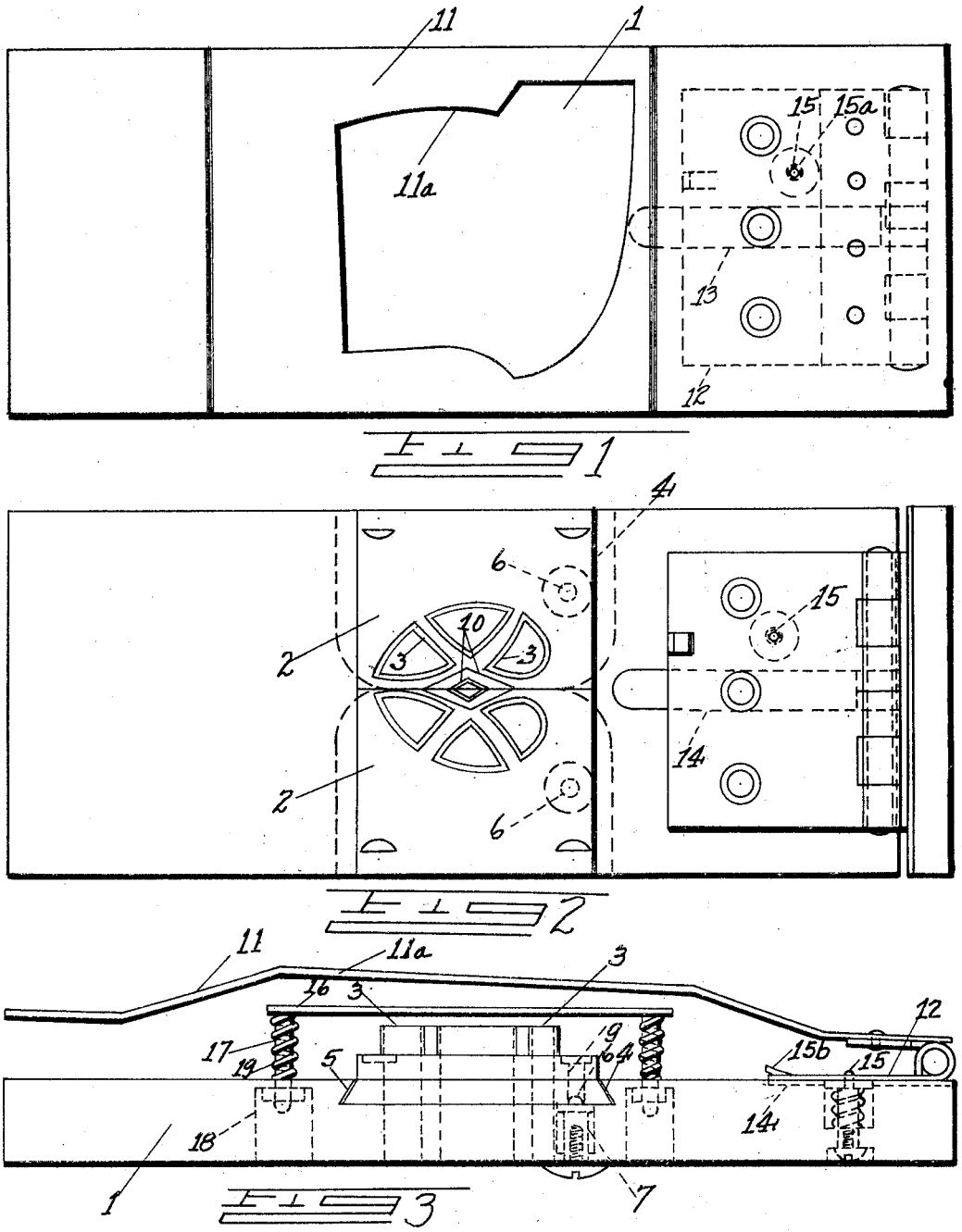
INVENTOR.
Benjamin William Freeman
BY
Allen & Allen
ATTORNEY.

Sept. 6, 1932.  B. W. FREEMAN  1,875,720
WORK SUPPORTING DEVICE FOR SHOE ORNAMENTING MACHINERY
Filed July 19, 1927  2 Sheets-Sheet 2
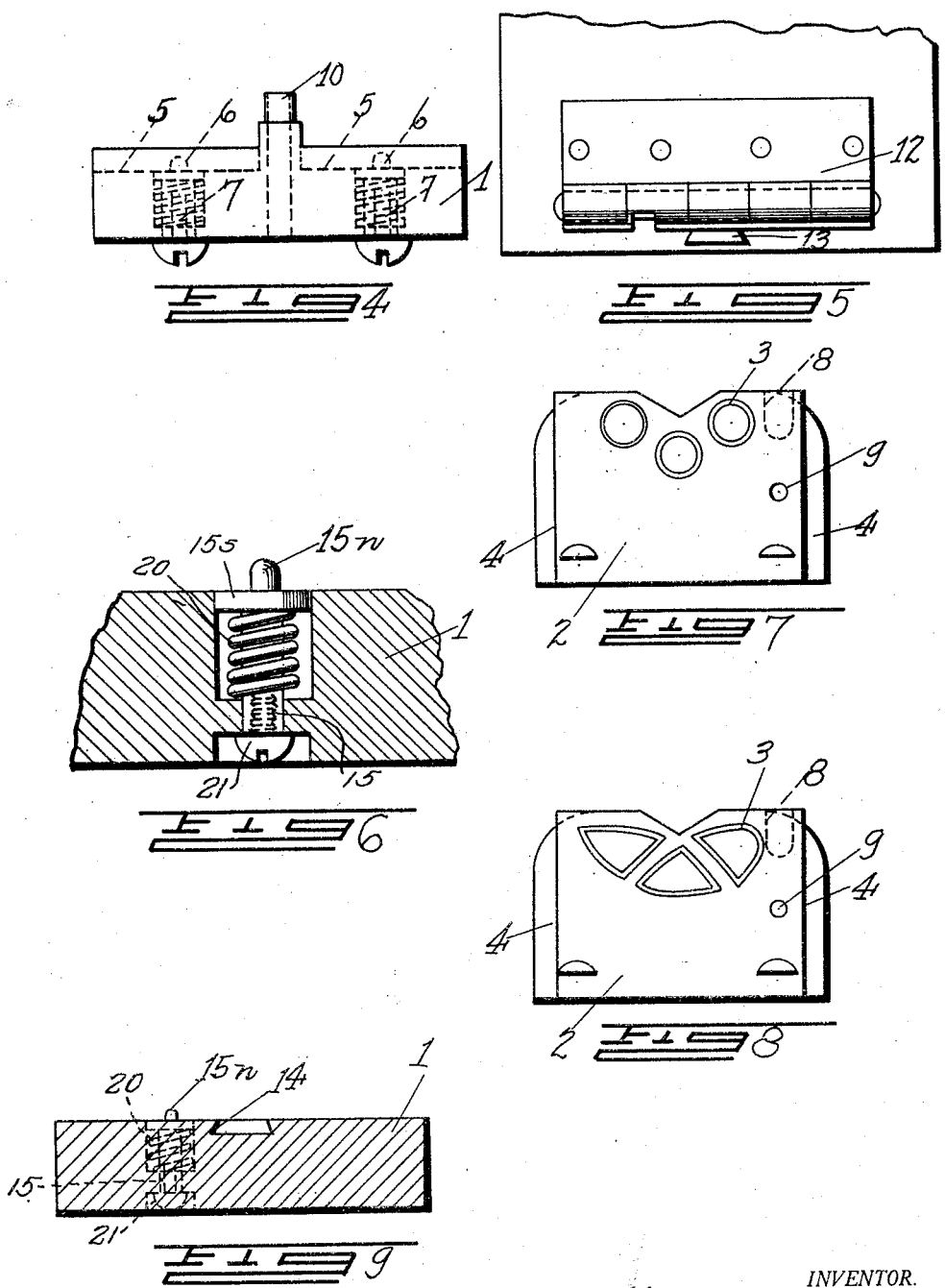
INVENTOR.
Benjamin W. Freeman
BY
Allen & Allen
ATTORNEY.

Patented Sept. 6, 1932

1,875,720

UNITED STATES PATENT OFFICE

BENJAMIN WILLIAM FREEMAN, OF CINCINNATI, OHIO

WORK SUPPORTING DEVICE FOR SHOE ORNAMENTING MACHINERY

Application filed July 19, 1927. Serial No. 206,966.

My invention relates to work supports for shoe ornamenting machinery of the classes known in the trade as cut-out and perforating machines and the like, and the improvements which I contemplate relate particularly to the work supporting, work cutting, and work holding devices associated with the above noted class of shoe ornamenting machines.

It is an object of my invention to provide quickly interchangeable dies for such machines which are detachably mounted on a supporting plate. It is also an object of my invention to provide quickly detachable gauging and clamping devices associated with a work supporting plate.

In my co-pending application, which matured into Patent No. 1,681,033, August 14th, 1928, I have disclosed a cut-out machine which has become known in the trade as such, and for purposes of illustration I have illustrated embodiments of my invention associated with such a machine. This type of machine has assemblies of supports, cutting dies, and gauging and work holding devices which are movable from work positioning to work operating position.

It has been customary, prior to my invention, to provide, for different types of shoes, different assemblies of work supports, cutting dies, and clamping and gauging devices. In some factories where the quantity of work done has not justified the expenditure of the amount necessary for each particular lot of shoes, it has been a decided hardship for the manufacturer to have to purchase complete assemblies of work supports, cutting dies and work holding devices for each different pattern or size. It is broadly the object of my invention to make the assemblies of work supports, dies and masks more serviceable by providing a work supporting plate in which different arrangements of dies may be provided by removing the dies from the supporting plate and interchanging them in a different arrangement. It is further my object to provide work supporting plates in which the masks, clamping or gauging plates may be quickly removable, and in which more than one mask may be used with the same supporting plate by the removal and interchange of the parts.

The above and other objects to which reference will be made during the ensuing disclosure I accomplish by that certain arrangement and combination of parts of which I have illustrated a preferred embodiment.

In the drawings:—

Figure 1 is a plan view of a supporting plate with a gauging and clamping plate detachably secured thereto.

Figure 2 is a plan view of a supporting plate with the dies for forming the cut-out work in an open work pattern shown detachably mounted on the plate.

Figure 3 is a side elevation showing in combination with a supporting plate a detachable mask, detachable die plates, and a stripper plate for elevating the work from the die plates after the cutting out operation.

Figure 4 is an end elevation showing the supporting plate with the dies detached from the plate.

Figure 5 is an end elevation of the clamping mask detached from the supporting plate.

Figure 6 is a section through a supporting plate showing one type of clamping pin which may be used for detachably securing the dies or mask to the support.

Figure 7 is a plan view of a cutting die detached from the supporting plate.

Figure 8 is a plan view of a different type of cutting die assembly from that shown in Figure 7.

Figure 9 is a lateral section through the supporting plate with the mask removed from the plate.

Generally indicated at 1 is the supporting plate, which, in the preferred type of cut-out machine to which reference has been made, is mounted so that clearance may be had for inserting a closed upper over or about the work support and cutting die assembly. The cutting dies of which we have shown several different styles are indicated in Figures 7 and 8. The die assemblies are made of plates 2 having the cutting knives 3 welded or otherwise attached thereto, or being integrally formed therewith. I have shown the plates 2 with beveled dovetail portions 4, which slidably engage dovetailed slots 5 in the supporting plate 1.

For retaining the dies in position I have shown spring pins 6 which are held in tensioned position by the spring 7. This spring pin structure is identical with that hereinafter described in detail and illustrated in Fig. 6. The die plates have inclined lips 8 on their under surfaces which cause the spring pins to be depressed when the dies are slidably inserted in the slots 5. The die plates have apertures 9 in proper alignment with the spring pins, so that the inner end of the pins will interlock in the apertures when the die plates are in proper registry with the supporting plate. The dies may be withdrawn by inserting a pin or pointed instrument through the upper end of the apertures 9 and depressing the spring pins 6 and at the same time sliding the dies outwardly in the dovetailed slots.

Referring to Figure 2, it will be observed that there is a permanently attached central die portion 10 with two die plates 2 of the type shown in Figure 8. By withdrawing the removable die plates and allowing the central portion 10 to remain, a new pattern may be cut out by using different designed dies such as are shown in Figure 7, to form the main body of the design. Although I have shown different arrangements of cutting dies, it will be within the scope of my invention to provide dies of similar shape but of different size. It is believed that the economy of having the dies independent of the supporting plate will be quite obvious. A skilled operator may change the dies from the supporting plate more quickly than he could substitute a new assembly.

In Figures 1, 3 and 5, I have shown the supporting plate 1 with a work gauging and clamping plate attached thereto. The clamping plate 11 with the cut out portion 11a by which the work is gauged and held down is attached to a hinge 12 which has a lower face with a dovetailed rib 13 in it. The rib 13 slidingly engages a longitudinally extending dovetailed slot 14 in the supporting plate 1. One or more spring pins 15 are also shown which engage in apertures 15a in the hinge 12. The gauging and clamping plate which is also called the mask may thus be removed by pressing a pin or pointed instrument through the upper face of the aperture 15a and depressing the spring pin 15. The hinge has a cut out upturned lip 15b to cause the depression of the spring pin during the insertion of the rib 13 in the slot 14.

As illustrated in Fig. 6, the pin 15 is provided with a shoulder 15s which functions to guide the pin as it moves in the support 1. Encircling the pin and having one end in engagement with the plate and the other end engaging the shoulder 15s is a spring 20 which tends to normally move the pin out of the plate by its engagement with the shoulder. This outward movement is limited, however, by a head or other equivalent limiting means 21, which engages the supporting plate, as will be obvious. A locking portion 15n extends from the pin, beyond the shoulder 15s, this portion being desirably reduced in diameter from the main diameter of the pin 15.

Figure 3 shows the normal arrangement of the complete assembly of supporting plate, detachable die plates, and detachable clamping plate. This figure also shows a stripper plate 16 mounted on pins 17 which are slidingly retained in apertures 18 in the supporting plate 1 and tensioned to elevate the stripper plate from the supporting plate by the springs 19. As shown in Figure 3, when a stripper plate is used in the combination, it will ordinarily be so mounted that the die plates may be removed without making it necessary to remove the stripper plate also.

In the past die plates and clamping plates have been mounted on supporting plates with machine screws which could be removed. In a sense, therefore, the dies have been removably mounted. In the claims which follow, however, I employ the words "quickly detachably mounted" to signify a mounting which is readily accessible for detachment to the machine operator without a long and tedious operation such as is required for removing a set of machine screws.

Having thus described by invention, what I claim as new and desire to secure by Letters Patent, is:

1. A device of the character specified, comprising a support, a cutting device and a clamping device, said support comprising a plate having grooves at its side and end, said cutting device slidably engaging said grooves at a side of said plate and the clamping device slidably engaging a groove at an end of said plate.

2. A device of the character specified, comprising a support, a cutting device and a clamping device, said support comprising a plate having dovetail grooves at the side and end of the plate, said cutting device having projections to slidably engage the grooves at the side of said plate and the clamping device slidably engaging a groove at an end of said plate.

3. In a device of the character specified, a supporting plate having dovetailed slots therein, dies slidingly engaging some of the dovetailed slots, and a pivotal clamping plate slidingly engaging other of said dovetailed slots.

4. In a device of the character specified, a supporting plate having dovetailed slots therein, with dies slidingly engaging some of the dovetailed slots, and a clamping plate slidingly engaging other of said dovetailed slots, and releasable means for locking said dies and clamping plate in the slots on said support.

5. An assembly for use in combination with a shoe ornamenting machine comprising a supporting unit, and a die unit removably supported thereon, one of said units being flanged and the other of said units being recessed to receive said flanges thereby to retain the die unit against displacement, and a spring latch for retaining the units in position comprising a locking pin movably mounted in one of said units and provided with a shoulder acting as a guide for the pin as it moves to locking or releasing position, means in the other of said units to depress said pin, means in said unit to thereafter engage said pin to lock the units together, and means to move said pin.

6. An assembly for use in combination with a shoe ornamenting machine comprising a supporting unit, having recesses for receiving a die unit, a die unit having a mounting accessible for ready detachment, comprising portions of the die unit arranged to slidingly engage said recesses to retain the die unit against displacement, a pin for locking the units in position, movably mounted in one of said units and provided with a shoulder acting as a guide for the pin as it moves to locking or releasing position, means in the other of said units to depress said pin, means engageable thereafter with the pin to lock the units together and means to move said pin.

7. An assembly for use in combination with a shoe ornamenting machine, comprising a supporting unit having recesses for receiving a die unit, a die unit having a mounting accessible for ready detachment comprising portions of the die unit arranged to slidingly engage said recesses to retain the die unit against lateral displacement, a pin for locking the units in position, movably mounted in one of said units and provided with a shoulder acting as a guide for the pin as it moves to locking or releasing position, means in the other of said units to depress said pin, means accessible thereafter with the pin to lock the units together, and resilient means to move said pin automatically into locking position.

8. An assembly for use in combination with a shoe ornamenting machine comprising, a supporting member, said supporting member having a permanent die element thereon, grooves leading from said permanent die element to the edge of the member, detachable complementary die elements slidably engaging said grooves, and means for locking said detachable die elements in position, comprising a spring pressed pin in said member normally interlocking with said detachable element and depressible to release said die element.

9. Shoe ornamenting mechanism for use in a shoe ornamenting machine having a presser member, comprising a support having a cutting die mounted thereon, said support having recessed portions extending from said die, and complemental die elements having projections adapted to slidingly engage said recessed portions, and a spring latch for locking said projections in engaged position.

10. Shoe ornamenting mechanism for use in a shoe ornamenting machine having a presser member comprising a support having a cutting die mounted thereon, said support having recessed portions extending from said die, and complemental die elements having projections adapted to slidingly engage said recessed portions and a depressible latch for locking said projections in engaged position, said spring latch being effective to lock said projections when said complementary elements have been moved to a position in which they are complementary to the die element on the support.

11. Shoe ornamenting mechanism for use in a shoe ornamenting machine, having a presser member comprising in combination with a movable support, a die unit having a base and ornamenting dies mounted thereon, aligning devices for mounting said die unit and base on said support, said support having cooperating aligning elements and a complementary die unit, and a work holding plate also carried by said support and having clearance at its sides to facilitate the positioning of the work, said plate being movable with said support and relative thereto.

12. Shoe ornamenting mechanism for use in shoe ornamenting machine having a presser member, comprising in combination with a movable support, a die unit comprising a base having a cutting die mounted thereon, said support having a complementary die element permanently mounted thereon and recessed portions extending from said element, said base having projections adapted to slidingly engage said recessed portions, and a spring latch for locking said projections in engaged position, said support being adapted for movement in the machine whereby the die may be moved to and from operating position.

13. In a machine for cutting designs in shoe uppers, a die support, a die quickly detachably mounted in said support, a locking pin movably mounted in said die support relative to said die, said pin being provided with a shoulder to act as a guide for the pin as it moves into locking or releasing position, a spring encircling a portion of said locking pin and pressing normally against said shoulder, means connected with said locking pin for limiting the movement thereof, locking means on said pin, effective to engage the die, whereby said pin will hold the die to the support, means extending from said die to locate the die in proper position on the support and an opening in said support into which the locating means extends in positioning the die on the support.

14. In a machine for cutting designs in shoe uppers, a die support, a die quickly detachably mounted in said support, a locking pin movably mounted in said die support relative to said die, said pin being provided with a shoulder to act as a guide for the pin as it moves into locking or releasing position, a spring encircling a portion of said locking pin and pressing normally against said shoulder, means connected with said locking pin for limiting the movement thereof, locking means on said pin effective to engage the die whereby said pin will hold the die to the support, means on said support to guide the die as it is attached and detached therefrom.

15. In a machine for cutting designs in shoe uppers, a die support, a die quickly detachably mounted in said support, means to guide said die as it is attached and detached therefrom, a locking pin mounted for resilient movement in said support relative to said die, said pin being provided with a shoulder acting as a guide for the pin as it moves into locking or releasing position, means connected with said locking pin for limiting the movement of said pin, and locking means on said pin for holding said die to said support.

16. In a machine for cutting designs in shoe uppers, a die support having openings for mounting a die thereon, a cutting die removably mounted on said support having extending portions, said portions and said openings being shaped to fit each other, a locking pin movably mounted in said support and having a shoulder acting as a guide for the pin as the pin moves in the die support to locking or releasing position, said pin having a portion contacting with the extending portions of the die thereby to lock the die in the support, a spring encircling a portion of said locking pin and normally pressing against said shoulder, thereby to position the pin to lock the die in the support, means to limit the movement of the pin in said support, and guiding means associated with said die for positioning work to be cut.

17. In a machine for cutting designs in shoe uppers, a die support, a die quickly detachably mounted in said support, a locking pin movably mounted in said die support relative to said die, spring means normally urging said pin into locking position, means connected with said pin for limiting the movement thereof, and locking means on said pin for contacting with said die thereby to hold same to the support, means extending from said die to locate the die in proper position on the support and an opening in said support coacting with said locating means in positioning the die.

18. In a machine for cutting designs in shoe uppers, a die support, a die mounted for quick detachment in said support, means to lock said die in said support, comprising a locking pin slidably mounted in said support relative to said die, said pin being provided with a shoulder to guide the same as it slides in the support, a spring in said support pressing against said shoulder to normally maintain said pin in locking position, means to limit the movement of said pin, and means on said pin engageable with the die when the pin is in locking position to hold the die on the support.

19. In a machine for cutting designs in shoe uppers, a die support, a die mounted for quick detachment in said support, means to lock said die in said support, comprising a locking pin slidably mounted in said support relative to said die, said pin being provided with a shoulder to guide the same as it slides in the support, a spring in said support pressing against said shoulder to normally maintain said pin in locking position, means to limit the movement of said pin, means on said pin engageable with the die when the pin is in locking position to hold the die on the support, said die having a projection engageable with said support to properly locate the die on the support.

20. In a machine for cutting designs in shoe uppers, a die support, a die mounted for quick detachment therein, locking means effective to retain said die on the support, comprising a member mounted for movement in the support relative to said die, said member being provided with a shoulder to guide the member as it moves into locking or releasing position, spring means in said support effective to normally maintain said member in locking position, means to limit the spring actuated movement of said member, means on said member effective to engage the die whereby said member will retain the die on the support, and means on the support to guide the die as it is attached and detached therefrom.

21. In a device of the character specified, a supporting plate having dovetailed slots therein, dies slidably engaging some of the dovetailed slots, and a pivotal clamping plate slidably engaging others of said dovetailed slots, and spring latches for retaining said dies and clamping plate in position, each comprising a locking pin movably mounted in one of said units and provided with a shoulder acting as a guide for the pin as it moves to locking or releasing position, means in the other of said units to engage said pin thereby to lock the units together, and means to move said pin.

BENJAMIN WILLIAM FREEMAN.